United States Patent [19]

Tanaka et al.

[11] Patent Number: 4,871,128

[45] Date of Patent: Oct. 3, 1989

[54] AUTO REVERSE MECHANISM FOR TAPE RECORDER/PLAYBACK DEVICES

[75] Inventors: Taro Tanaka; Joji Tanaka, both of Tokyo, Japan

[73] Assignee: Wako Kabushiki Kaisha, Kanagawa, Japan

[21] Appl. No.: 195,839

[22] Filed: May 19, 1988

[30] Foreign Application Priority Data

May 20, 1987 [JP] Japan .................................. 62-123549

[51] Int. Cl.$^4$ .............................................. G11B 15/44
[52] U.S. Cl. .................................... 242/201; 360/74.2
[58] Field of Search ............... 242/186, 201, 206, 208; 360/74.1, 74.2, 96.2, 96.3, 96.4

[56] References Cited

U.S. PATENT DOCUMENTS 4,497,001 1/1985 Hayashi et al. .................... 360/74.2
4,591,932 5/1986 Aratani ........................... 360/74.2 X Primary Examiner—David Werner
Attorney, Agent, or Firm—Wenderoth, Lind & Ponack

[57] ABSTRACT

The present invention is an auto reverse mechanism for tape recorder/playback devices. In the present invention, if the tape travel in either direction is completed to stop the rotation of the reel turntables, a detector at first detects the halt of the reel turntables through the change-over clutch, and mechanically transmits it to the trigger. The trigger then drives the intermittent drive by the drive force of the drive belt mechanism through the drive force transmission, from a position away from the linkage with the drive force transmission to a position for the linkage with it. Thus, the intermittent drive brought into the position for the linkage with the drive force transmission is driven by the drive force of the drive belt mechanism through the drive force transmission, to drive the a change-over mechanism from one action position to the other action position, as one of its intermittent actions, for actuating the switching action of the change-over clutch and at the same time for selectively detaching either of the pinch rollers from the capstan. Thus, the predetermined automatic change of tape travel direction is released to prevent further driving. Through these actions, the present invention allows the tape travel direction to be changed after completion of tape travel in either direction, by using only the drive force of the tape travel mechanism.

5 Claims, 8 Drawing Sheets

AUTO REVERSE MECHANISM FOR TAPE RECORDER/PLAYBACK DEVICES

BACKGROUND OF THE INVENTION

The present invention relates to an auto reverse mechanism for automatically changing the tape travel direction after completion of tape travel in either direction, to be used in tape recorder/playback devices such as cassette tape players.

An auto reverse mechanism for tape recorder/playback devices must be provided with a device for detecting the completion of tape travel in either direction and a drive for driving the travel direction changeover mechanism upon detection by the detection device, in order to automatically change the direction of tape travel after completion of tape travel in either direction.

In the conventional auto reverse mechanism, the completion of tape travel in either direction is detected, for example, by means of detecting the increase of tape tension caused by the completion of travel as an electric signal, using a microswitch, etc., and the driving is carried out by means of an electromagnetic actuator, etc. actuated by the electric signal from the microswitch, etc. That is, in the conventional auto reverse mechanism, the detection device and the drive are independent of the tape travel mechanism.

Therefore, these additional parts raise the cost and require extra space making it very difficult to design tape recorder/playback devices, especially cassette tape players for motor vehicles, required to be reduced in size for installation.

SUMMARY OF THE INVENTION

The present invention purely mechanically integrates a detection device and drive into the tape travel mechanism, to change the travel direction after completion of tape travel in either direction, by using the drive force of the tape travel mechanism, thereby overcoming the disadvantage of the conventional mechanism.

The present invention is an auto reverse mechanism for tape recorder/playback devices, which is provided with a pair of reel turntables arranged on both sides, a pair of capstans, a pair of pinch rollers, a change-over clutch for selectively driving either of the reel turntables, a drive belt mechanism for driving the capstans and the reel turntables through the change-over clutch, and a change-over mechanism for actuating the switching action of the change-over clutch and for selectively detaching either of the pinch rollers from the capstan. The auto reverse mechanism has a drive force transmission mechanism driven by the drive belt mechanism, an intermittent drive mechanism driven in linkage with the drive force transmission mechanism, to drive the change-over mechanism from one action position to the other action position, as one of its intermittent actions, and subsequently released from the linkage with the drive force transmission mechanism, a detection mechanism for detecting the halt of the reel turntable through the change-over clutch, and mechanically transmitting the detection to a trigger mechanism described below, and a trigger mechanism kept always in linkage with the drive force transmission mechanism and capable of driving the intermittent drive mechanism from a position away from the linkage with the drive force transmission mechanism to a position for linkage with it only when the detection mechanism detects the halt of the reel turntable.

In this mechanical composition of the present invention, when the tape travel in either direction has been completed to stop the rotation of the reel turntables, the detection mechanism detects the halt of the reel turntables through the change-over clutch, and mechanically transmits it to the trigger mechanism. The trigger mechanism then drives the intermittent drive mechanism from a position away from the linkage with the drive force transmission mechanism to a position for linkage with it, by the drive force of the drive belt mechanism through the drive force transmission mechanism. The intermittent drive mechanism thus brought into the position for linkage with the drive force transmission mechanism is driven by the drive force of the drive belt mechanism through the drive force transmission mechanism, to drive said change-over mechanism from one action position to the other action position, as one of its intermittent actions, for actuating the switching action of the change-over clutch and selectively detaching either of the pinch rollers from the capstan. Thus, the predetermined automatic change of tape travel direction is completed, and the linkage of the intermittent drive mechanism with the drive force transmission mechanism is released, without any further drive actuated unless the reel turntables stop again.

Through these actions, the present invention allows the tape travel to be changed in direction after completion of travel in either direction, by using only the drive force of the tape travel mechanism.

BRIEF DESCRIPTION OF THE DRAWING

The present inventino is described below in detail with reference to the accompanying drawings which show preferred embodiments.

GENERAL DESCRIPTION OF THE INVENTION

Figure 1:
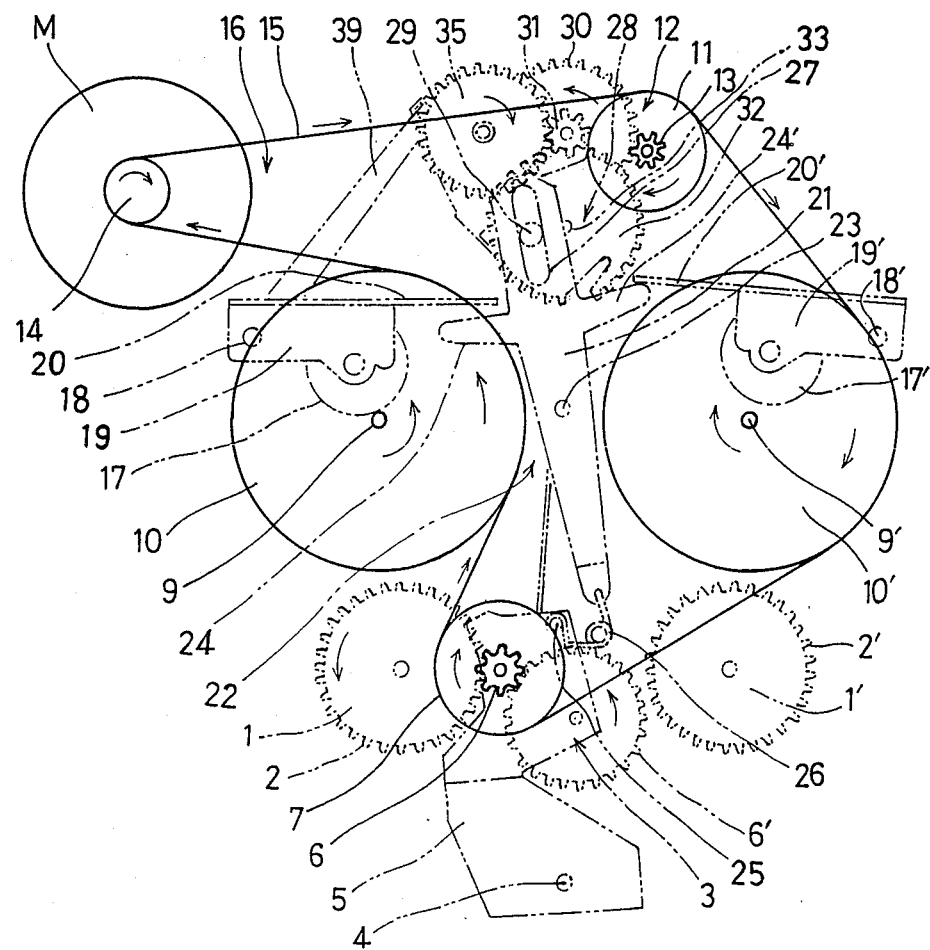
FIG. 1 is a plan view of the auto reverse mechanism of the present invention. The component parts of the drive belt mechanism are indicated by full lines while the other component parts are indicated by broken lines.

The preferred embodiment of the auto reverse mechanism of the invention, as shown more particularly in the drawing, is provided with a pair of reel turntables 1 and 1' arranged on both sides, a pair of capstans 9 and 9', a pair of pinch rollers 17 and 17', a change-over clutch 3 for selectively driving either of the reel turntables 1 and 1', a drive belt mechanism 16 for driving capstans 9 and 9' and reel turntables 1 and 1' through the change-over clutch 3, and a change-over mechanism 22 for actuating the switching action of the change-over clutch 3 and for selectively detaching either of said pinch rollers 17 and 17' from the capstans 9 and 9'. The auto reverse mechanism has a drive force transmission mechanism 12 driven by the drive belt mechanism 16, an intermittent drive mechanism 28 driven in linkage with the drive force transmission mechanism 12, to drive the change-over mechanism 22 from one action position to the other action position, as one of its intermittent actions, and subsequently released from linkage with the drive force transmission mechanism 12, a detection mechanism 51 for detecting the halt of the reel turntable 1 or 1' through the change-over clutch 3, and mechanically transmitting it to a trigger mechanism 55 described below, and a trigger mechanism 55 kept always in linkage with the drive force transmission mechanism 12 and capable of driving the intermittent drive mechanism 28 from a position away from linkage with the drive force transmission mechanism 12 to a position for the linkage with it only when the detection mechanism 51 detects the halt of said reel turntable 1 or 1'.

The entire composition of the present invention is described below in detail based on the drawings.

DETAILED DESCRIPTION OF THE INVENTION

Figure 2A:
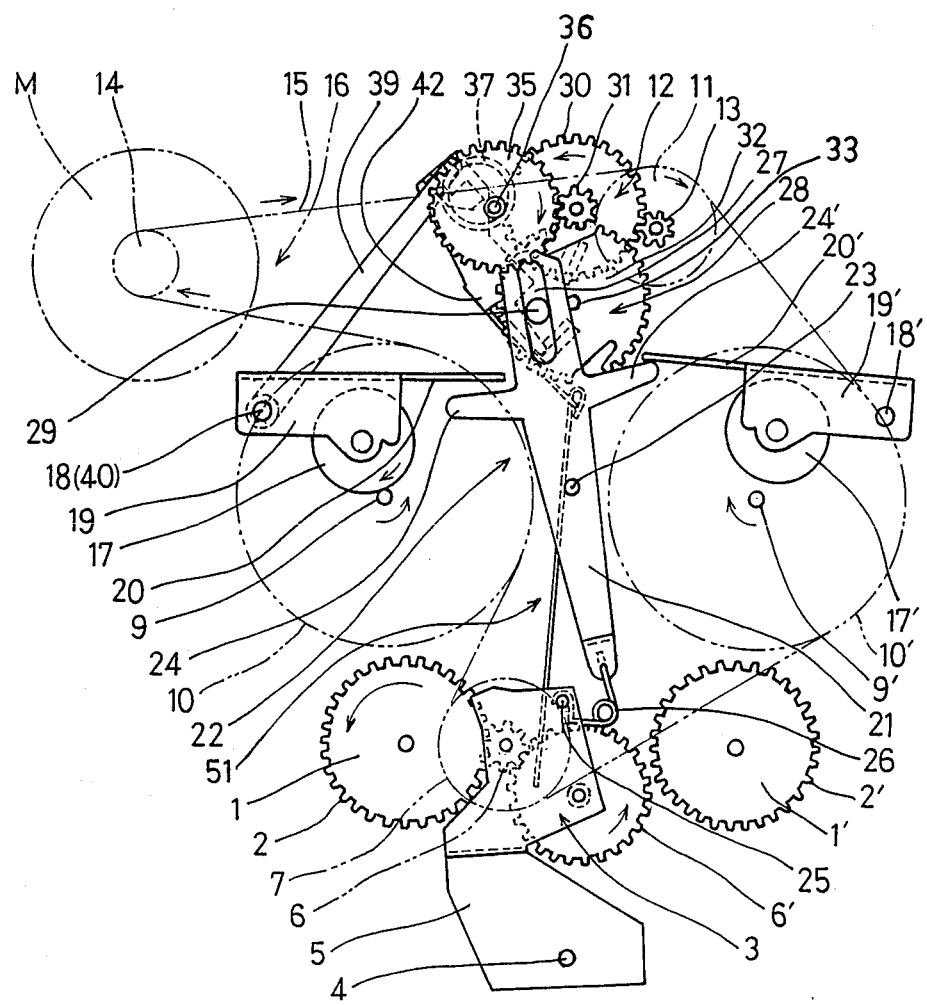
FIG. 2A is a view similar to FIG. 1, but the component parts of the drive belt mechanism are indicated by broken lines while the other component parts are indicated by full lines.
Figure 2B:
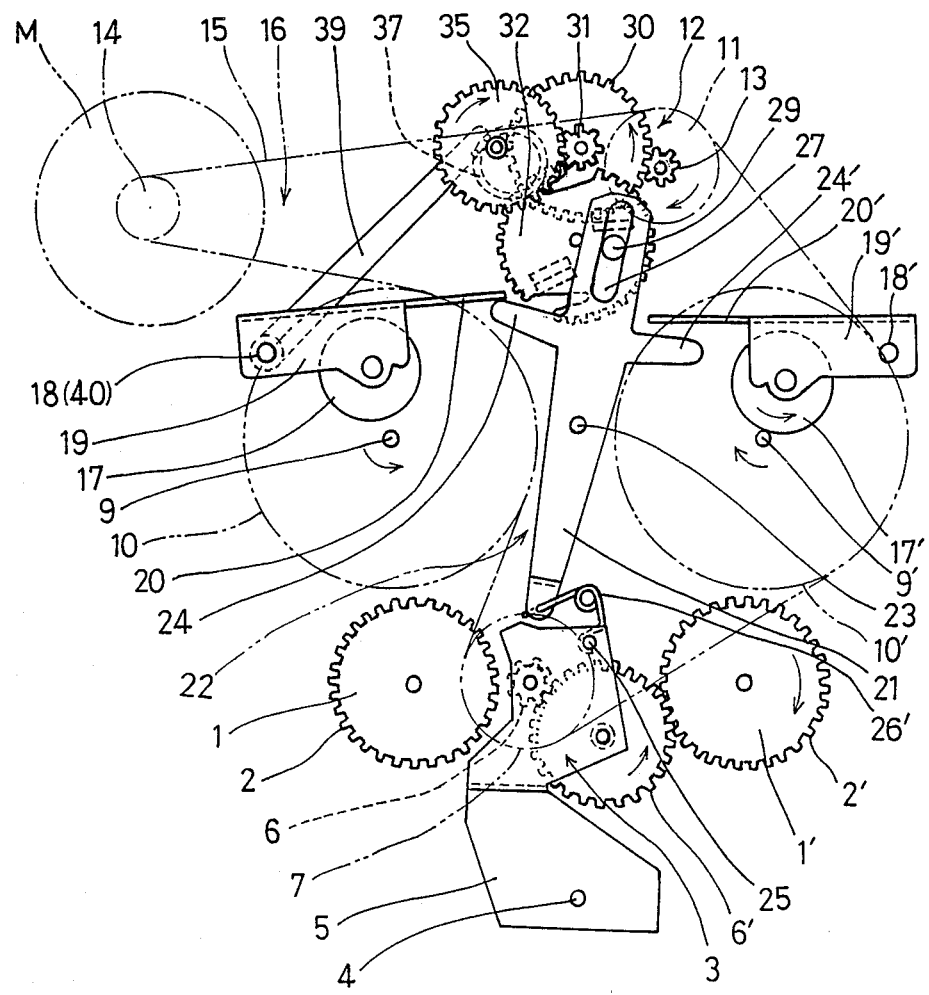
FIG. 2B is a view similar to FIG. 2A, but the tape travel direction is reversed.
Figure 3:
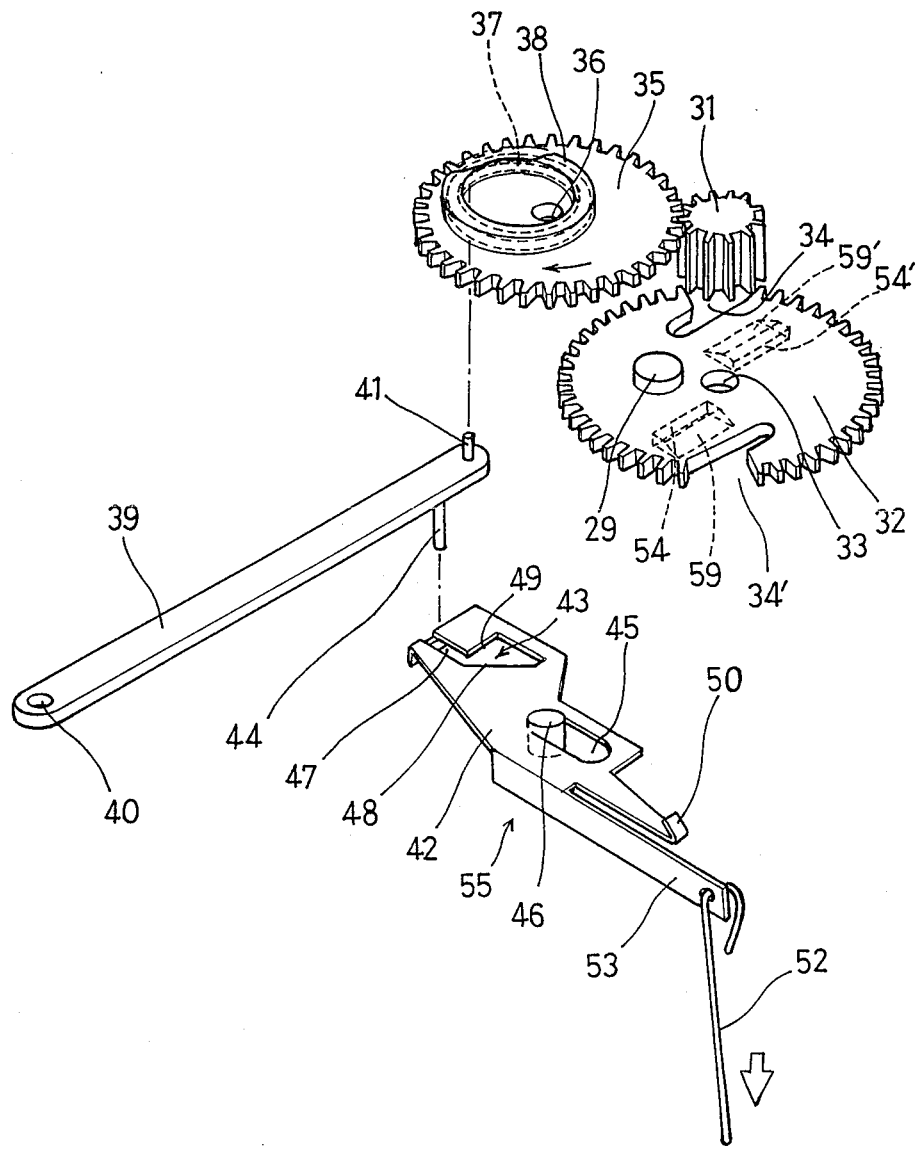
FIG. 3 is an exploded perspective view of the component parts of the portion of the auto reverse mechanism of the present invention.

In FIGS. 1, 2 and 3, symbols 1 and 1' stand for a pair of reel turntables arranged on both sides, and the respective reel turntables 1 and 1' are provided with reel gears 2 and 2'. These reel turntables 1 and 1' are rotatably fastened to a chassis (not illustrated). Between the reel turntables 1 and 1' on both sides, a change-over clutch 3 is arranged.

The change-over clutch 3 has a pair of mutually engaged gears 6 and 6' supported by a support plate 5 pivotally rotatably fastened at a fulcrum 4 to the chassis. The pivotal rotation of the support plate 5 causes either of the gears 6 and 6' to be selectively engaged with the corresponding reel gear 2 or 2'. The gear 6 is provided with a pulley 7. In addition, the change-over clutch 3 is provided with a component of a detection mechanism 51, but the detail is described later.

Symbols 9 and 9' stand for capstans, and the capstans 9 and 9' are provided with flywheels 10 and 10' acting also as pulleys. They are rotatably fastened to the chassis.

Symbol 11 stands for a drive pulley acting as a component of a drive force transmission mechanism 12, and a drive force transmission gear 13 is provided coaxially with the drive pulley 11. The drive pulley 11 is also fastened to the chassis.

Symbol M stands for a motor. An endless belt 15 is arranged along a route starting from a pulley 14 fastened to the revolving shaft of the motor M through the drive pulley 11, flywheel 10', pulley 7 and flywheel 10 and returning to the pulley 14, to constitute the drive belt mechanism 16, or the tape travel mechanism.

Symbols 17 and 17' stand for pinch rollers. The pinch rollers 17 and 17' are supported by holders 19 and 19' pivotally rotatable around fulcrums 18 and 18' fastened to the chassis. The holders 19 and 19' are provided with action pieces 20 and 20' protruding toward each other. The holders 19 and 19' are also provided with springs, though not illustrated, which respectively bias the pinch rollers 17 and 17' toward the capstans 9 and 9'.

Symbol 21 stands for a change-over lever acting as a component of a change-over mechanism 22. The change-over lever 21 is pivotally rotatably fastened to the chassis at a fulcrum 23. The change-over lever 21 has arms 24 and 24' formed on both sides to press the action pieces 20 and 20' upward in the drawing, and between the tip of the change-over lever 21 and a portion 25 of the support plate 5, a toggle spring 26 is connected. Furthermore, the change-over lever 21 has a slot 27, which is engaged with a crank protrusion 29 acting as a component of an intermittent drive mechanism 28 described later.

The action of the above composition is described below, without describing the action of the intermittent drive mechanism 28.

In FIG. 1, if the pulley 14 is rotated clockwise by the motor M, the endless belt 15 moves in the illustrated arrow direction. As a result, the drive pulley 11, flywheel 10' and pulley 7 are rotated clockwise, while the flywheel 10 is rotated counterclockwise. In the state shown in FIG. 1 or 2A, the change-over lever 21 is pivotally rotated counterclockwise around the fulcrum 23, to one action position, and in this state, the support plate 5 of the change-over clutch 3 is pivotally rotated counterclockwise around the fulcrum 4, and is biased by the toggle spring 26 in that direction, to keep the gear 6 engaged with the reel gear 2, while the left reel turntable 1 is rotated counterclockwise. Since the gear 6' is apart from the reel gear 2', the right reel turntable 1' is in a state to rotate freely. On the other hand, the arm 24' of the change-over lever 21 presses the action piece 20' upward, and the holder 19' is pivotally rotated clockwise around the fulcrum 18' against the biased of the spring. Therefore, the right pinch roller 17' is apart from the capstan 9'. Since the arm 24 of the change-over lever 21 does not act on the action piece 20 at all, the holder 19 is pivotally rotated clockwise around the fulcrum 18 by the energization of the spring, and the left pinch roller 17 is in pressure contact with the capstan 9.

In the above state, the cassette tape, though not illustrated, mounted at the predetermined position in the mechanism is caused to travel leftward in the drawing by the capstan 9 and pinch roller 17, being unwound from the reel on the right reel turntable 1' and wound by the reel on the left reel turntable 1. During the travel, the tape is brought into contact with a playback head or recording/playback head, etc., for playback or recording/playback, etc.

In this state, if the crank protrusion 29 acting as a component of the intermittent drive mechanism 28 is actuated, to pivotally rotate the change-over lever 21 around the fulcrum 23 clockwise, an action reverse to the above occurs; the left pinch roller 17 is detached from the capstan 9, and the right pinch roller 17' is brought into pressure contact with the capstan 9'. At the same time, in the change-over clutch 3, the gear 6' is engaged with the real gear 2', and the right reel turntable 1' is rotated clockwise, while the gear 6 is disengaged from the reel gear 2, to allow the reel turntable 1 to freely rotate.

In this state, the cassette tape is caused to travel rightward in the drawing by the capstan 9' and pinch roller 17', being unwound from the reel on the left reel turntable 1, and being wound by the reel on the right reel turntable 1'. In this way, by alternately pivotally rotating the change-over lever 21 clockwise and counterclockwise, the tape is caused to travel in one direction and the other alternately, for predetermined playback, or recording/playback, etc. in either direction.

Detailed description is made below on the mechanical composition and action for alternating the change-over lever 21 acting as a component of the change-over mechanism 22.

In FIGS. 1, 2A, 2B and 4A, symbol 11 stands for the drive pulley around which the endless belt 15 runs as a component of the drive belt mechanism 16, as mentioned before, and coaxially with the drive pulley 11, the drive force transmission gear 13 is provided. The drive force transmission gear 13 is engaged with an intermediate gear 30, to constitute a speed reducing mechanism by the drive force transmission gear 13 and the intermediate gear 30. Coaxially with the intermediate gear 30, a drive gear 31 is provided, and these components constitute the drive force transmission mechanism 12.

Adjacent to the drive gear 31, and intermittent drive gear 32 is provided, which lacks several teeth at two opposite portions across a revolving shaft 33, to form a pair of tooth-lacking portions 34 and 34'. The intermittent drive gear 32 is arranged at a position where it is not engaged with the drive gear 31 when a tooth-lacking portion 34 or 34' faces the drive gear 31, but is engaged with it to transmit rotation when any other portion faces it. The intermittent drive gear 32 is provided with a crank protrusion 29 which is engaged with the slot 27 of said change-over lever 21.

Adjacent to the drive gear 31, a crank gear 35 is provided, which is always engaged with said drive gear 31, and has an eccentric circular groove 37 formed against a revolving shaft 36. In FIG. 3, symbol 38 stands for a protrusion for securing a predetermined thickness for the circular groove 37. These gears are rotatably fastened to the chassis.

Symbol 39 stands for a crank lever pivotally rotatable around a fulcrum 40 at one end, which is fastened to the chassis. At the other end of the crank lever 39, a crank pin 41 is provided, to be engaged with the circular groove 37. At the other end of the crank lever 39, a trigger pin 44 is provided, to be engaged with a trigger groove 43 formed in a trigger lever 42 described later.

The trigger lever 42 is supported, with a slot 45 engaged with a fulcrum protrusion 46 provided on the chassis, to be able to move as well as rotate when driven by the trigger pin 44.

The trigger groove 43 is formed on one side of the trigger lever 42, and is composed of a withdrawal portion 47 at the extreme end, an inclination portion 48 communicating with the withdrawal portion 47 and an engagement portion 49 facing the inclination portion 48.

The trigger lever 42 is provided, on the other side, with a trigger claw 50 and a link strip 53 to be linked with a link 52 acting as a component of the detection mechanism 51 described later. On the other hand, the intermittent drive gear 32 is provided with a pair of engagement grooves 54 and 54' corresponding to the respective tooth-lacking portions 34 and 34', and either of the engagement grooves 54 and 54', e.g. the engagement groove 54 in the drawing, is engaged with said trigger claw 50 as shown in FIG. 3. These components constitute a trigger mechanism 55.

Figure 4A:
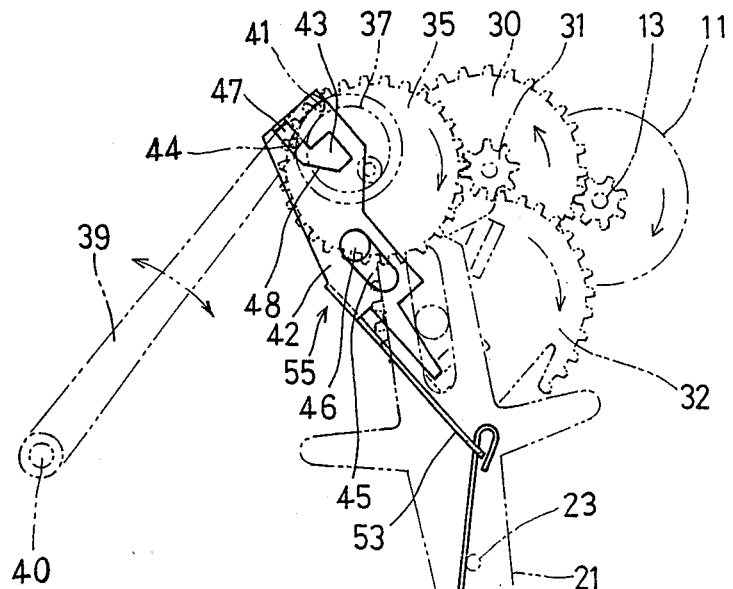
FIG. 4A is an fragmentary enlarged plan view of the component parts of the portion of the auto reverse mechanism of the present invention.
Figure 4B:
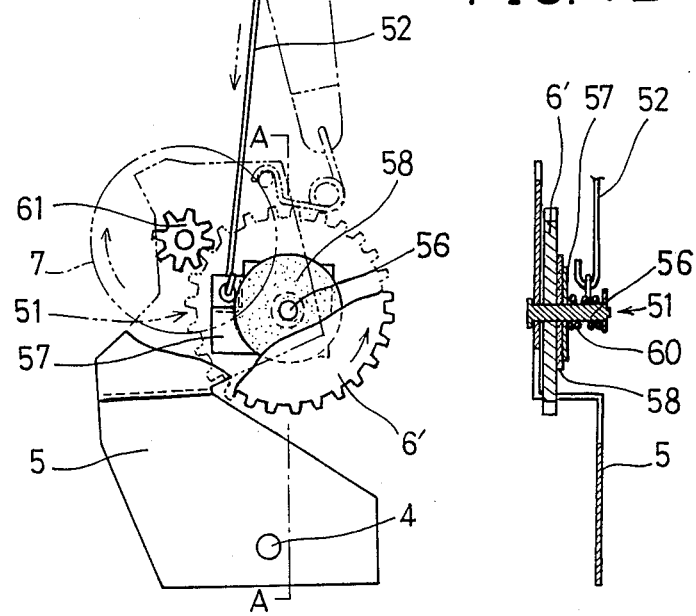
FIG. 4B is a sectional view taken on line A—A in FIG. 4A.

A shaft 56 which rotatably supports the gear 6' acting as a component of the said change-over clutch 3 also rotatably supports a detection plate 57, and a friction pad 58 is provided between the detection plate 57 and the gear 6'. The detection plate 57 is biased by a spring 60 shown in FIG. 4B toward the gear 6', and therefore, the friction pad 58 is held between the detection plate 57 and the gear 6' at a predetermined pressure.

The link 52 linked at one end with the link strip 53 is linked at the other end with the detection plate 57. The linking of the link 52 at the other end is achieved at a position where the other end of the link 52 pulls the one end when the detection plate 57 is pivotally rotated counterclockwise by the rotation of the gear 6'. The linking position is arranged so that when the other end of the link 52 pulls the one end like this, to pivotally rotate the trigger lever 42 by the link strip 53, the withdrawal portion 47 is positioned in the moving locus of the trigger pin 44. These components constitute the detection mechanism 51.

In this mechanical composition, when the tape travels in one direction, as mentioned before, the drive force of the tape travel mechanism 16 is transmitted to the drive gear 31 through the endless belt 15, drive pulley 11, drive force transmission gear 13 and intermediate gear 30, to rotate the drive gear 31. The rotation of the drive gear 31 causes the rotation of the crank gear 35 and the rotation of the circular groove 37 at the eccentric position. Therefore, the crank lever 39, the crank pin 31 of which is engaged with said circular groove 37, is pivotally rotated around the fulcrum 40 clockwise and counterclockwise alternately.

According to the pivotal rotation of the crank lever 39, the trigger pin 44 is moved alternately. The action caused by this movement is described below in reference to FIGS. 5A, 5B and 5C. When the crank lever 39 is pivotally rotated clockwise, the trigger pin 44 is at first moved from the withdrawal portion 47 to the inclination portion 48, while the trigger lever 42 is pivotally rotated around the fulcrum portion 46 counterclockwise as shown in FIG. 5B, until the trigger pin 44 is moved to the extreme end in this direction and is going to be moved along the inclination portion 48. Then, it is moved back along the same locus as that of the forward movement. When the trigger lever 42 has been pivotally rotated as mentioned above, the withdrawal portion 47 goes off the moving locus 61 of the trigger pin 44, and the engagement portion 49 comes into the moving locus 61.

Therefore, when the pivotally rotated state is maintained as shown in FIG. 5B, the trigger pin 44 is in contact with the wall of the engagement portion 49, when moved back, to move the trigger lever 42 as described later. However, when the tape normally travels in either direction, such movement does not take place.

When the tape travels normal in either direction, the gear 6' is rotated counterclockwise. Therefore, the detection plate 57 receives a frictional force in the rotating direction through the friction pad 58, to be pivotally rotated in that direction, for pulling the link strip 53 through the link 52. And the detection plate 57 is held at a position where the frictional force and the resiliency of the link strip 53 are balanced. The detection plate 57 is held at a predetermined position, but since it can relatively slide against the gear 6' through the friction pad 58, the tape travel is not adversely affected.

As mentioned before, while the trigger lever 42 is pivotally rotated by the trigger pin 44, the trigger pin 44 comes to the extreme end of movement, and then goes back along the same locus. At this moment, the trigger pin 44 does not transmit turning force to the trigger lever 42 through said inclination portion 48. Therefore, in this state, the trigger lever 42 is pivotally rotated in the direction reverse to the rotational direction by the trigger pin 44, due to the tensile force of the detection plate 57 applied through the link 52 to the link strip 53. As a result, the withdrawal portion 47 comes in the moving locus 61 of the trigger pin 44.

Figure 5A:
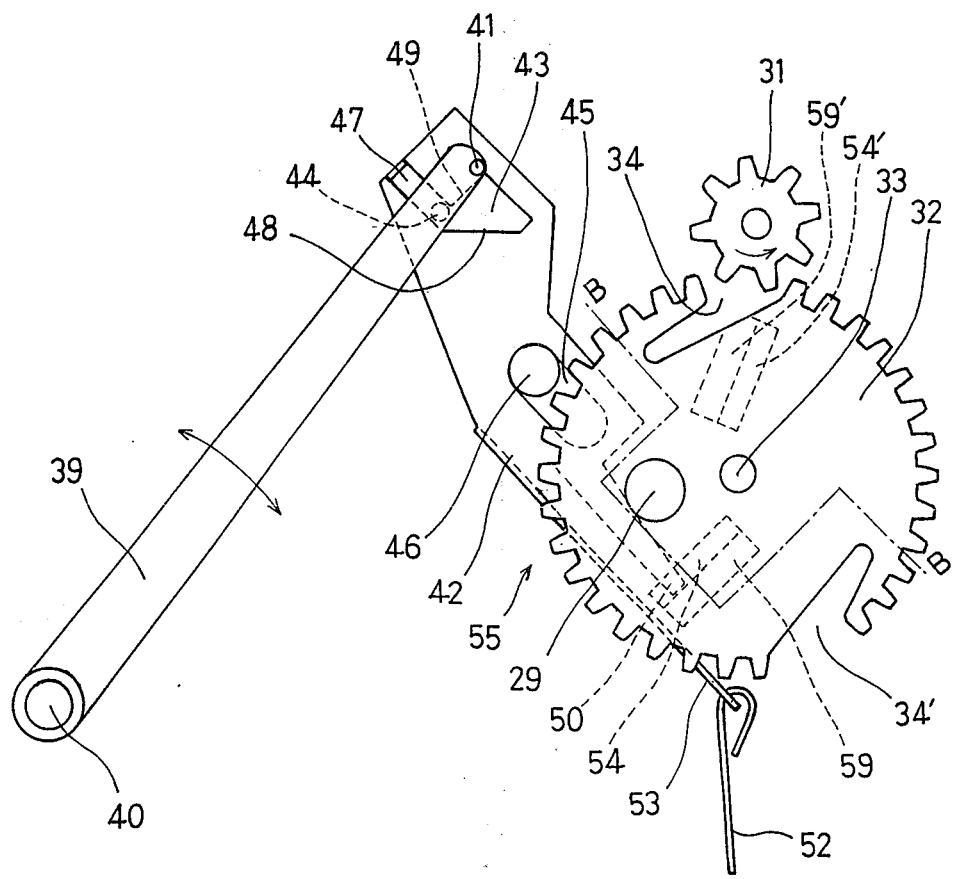
FIG. 5A, 5B and 5C are fragmentary enlarged plan views showing the action of the trigger mechanism.
Figure 5B:
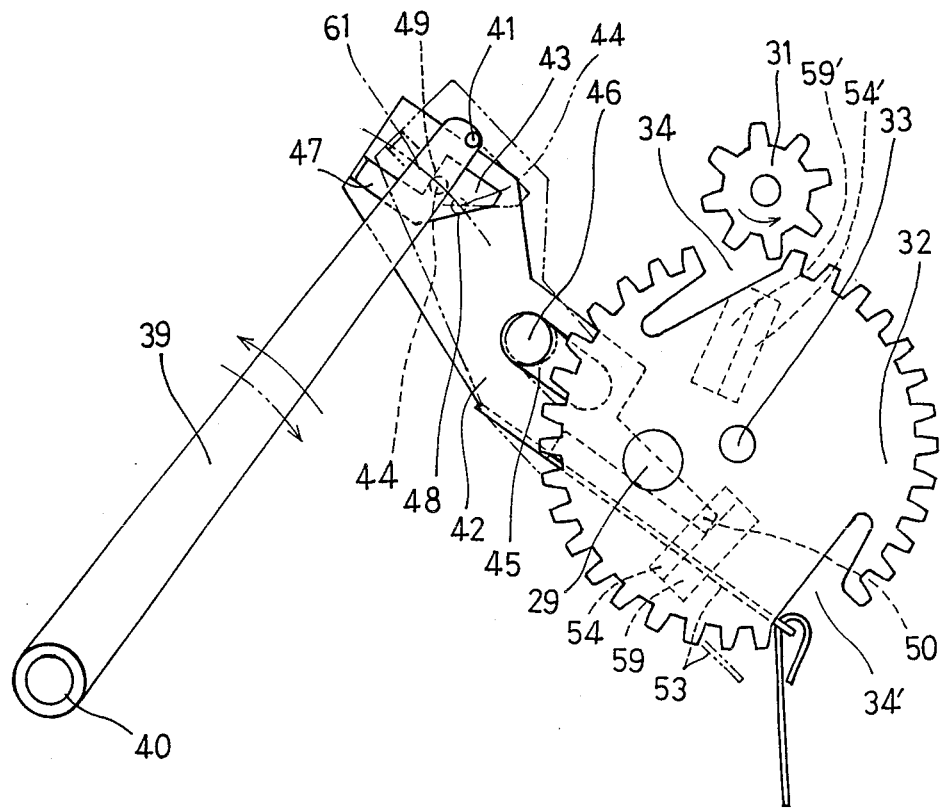

Therefore, when the trigger pin 44 moves in this state to the other end of movement, it moves along the withdrawal portion 47, without causing the action to move the trigger lever 42 as shown in FIG. 5A.

The above action is similarly repeated as far as the tape travels normally in either direction. In this action, the intermittent drive gear 32 is kept in a state to have either of the tooth-lacking portions 34 and 34' face said drive gear 31, and therefore, the change-over lever 21 is kept in either pivotally rotated position, without changing the tape travel direction.

If the above action continues till the tape travel in one direction is completed, it becomes impossible that the tape travels further and therefore that the reel turntables 1 and 1' engaged with the reels of the tape rotate further. The impossibility of rotation of the reel turntables 1 and 1' makes the rotation of the gears 6 and 6' also impossible. The impossibility of rotation of the gear 6' eliminates the force acting on the direction plate 57 from the gear 6' through the friction pad 58.

Thus, even if the trigger lever 42 is pivotally rotated by the trigger pin 44 as mentioned before, the link 52 does not give tensile force to the link strip 53, but rather acts on the link strip 53, to maintain the aforementioned pivotally rotated state of the trigger lever 42 by the frictional force between the detection plate 57 and the gear 6' through the friction pad 58.

Since the pivotally rotated state is maintained like this, the trigger pin 44 contacts the wall of said engagement portion 49 when moved back as shown in FIG. 5B, to move the trigger lever 42 in the direction in which the trigger pin 44 is moved back.

Figure 5C:
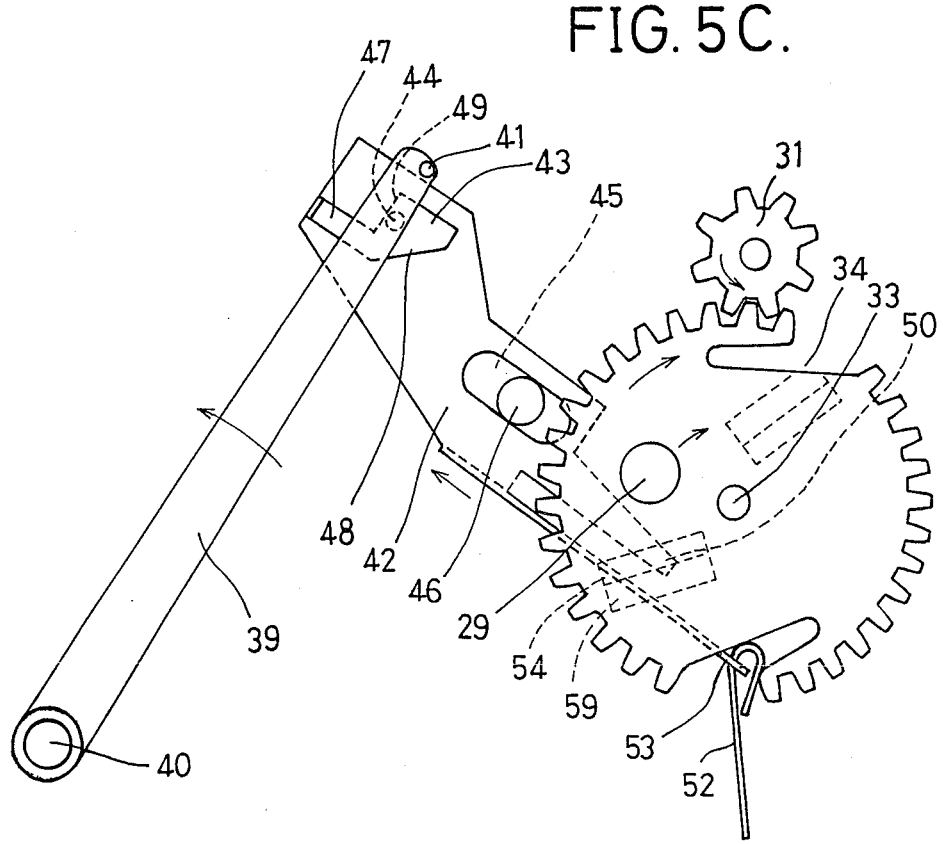
Figure 6:
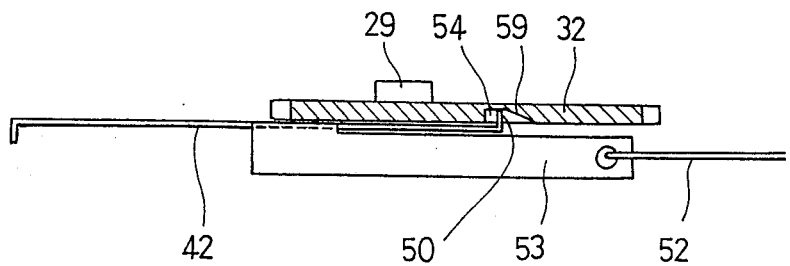
FIG. 6 is a schematic side view of FIG. 5A, partly in section taken on line B—B in FIG. 5A.

If the trigger lever 42 is moved as shown in FIG. 5C, the trigger claw 59 rotates the intermittent drive gear 32 slightly clockwise at the engagement groove 54. The slight rotation of the intermittent drive gear 32 like this causes the teeth adjacent to the tooth-lacking portion 34 to be engaged with the drive gear 31, and thereafter, the intermittent drive gear 32 is driven and rotated by the drive gear 31. This rotation brings the other tooth-lacking portion 34' for the drive gear 31, and the rotation of the intermittent drive gear 32 stops.

The above rotation of the intermittent drive gear 32 causes the crank protrusion 29 to rotate, for pivotally rotating the change-over lever 21 around the fulcrum 23. Thus, according to the aforementioned action, the tape travel direction is changed. The change of the tape travel direction is completed before the other tooth-lacking portion 34' reaches the drive gear 31, and if the tape changed in travel direction travels normally in the other direction, the gear 6' starts rotation again. The rotation of the gear 6' causes the tensile force of the detection plate 57 to act on the link strip 53 of the trigger lever 42 through the link 52 according to the aforementioned action. As a result, the trigger lever 42 is kept away from the moving force of the trigger pin 44. Thereafter, the intermittent drive gear 32 is kept in a stationary state.

In the above action, the trigger claw 50 is disengaged from the engagement groove 54 when the intermittent drive gear 32 is rotated by the drive gear 31, and slides on the flat surface of the intermittent drive gear 32, to be in preparation for the next action of being engaged again with the other engagement groove 54' when the intermittent drive gear 32 stops.

The engagement grooves 54 and 54' have inclined surfaces 59 and 59' formed on the side opposite to the engagement side, as required, to facilitate the aforementioned disengagement.

The above description is briefed below. In the present invention, if the tape travel in either direction is completed to stop the rotation of the reel turntables 1 and 1', the detection mechanism 51 at the first detects the halt of the reel turntables 1 and 1' through the change-over clutch 3, and mechanically transmits it to the trigger mechanism 55. The trigger mechanism 55 then drives the intermittent drive mechanism 28 by the drive force of the drive belt mechanism 16 through the drive force transmission mechanism 12, from a position away from linkage with the drive force transmission mechanism 12 to a position in linkage with the drive force transmission mechanism 12. Thus, the intermittent drive mechanism 28 brought into the position for the linkage with the drive force transmission mechanism 12 is driven by the drive force of the drive belt mechanism 16 through the drive force transmission mechanism 12, to drive the change-over mechanism 22 from one action position to the other action position, as one of its intermittent actions, for actuating the switching action of the change-over clutch 3 and at the same time for selectively detaching either of the pinch rollers 17 and 17' from the capstan 9 or 9'. Thus, the predetermined automatic change of tape travel direction is completed, and the linkage with the drive force transmission mechanism is released to prevent further driving.

Through these actions, the present invention allows the tape travel direction to be changed after completion of tape travel in either direction, by using only the drive force of the tape travel mechanism.

In the present invention, since the mechanism for detecting the completion of tape travel in either direction and the drive mechanism for driving the travel direction change-over mechanism upon detection by the detection mechanism are purely mechanically integrated into the tape travel mechanism, components of those mechanisms independent of the tape travel mechanism are not required. Therefore, the cost can be reduced, and extra space is unrequired, so that reduction in size is easy. For this reason, the mechanism of the present invention can be effectively easily applied also to the cassette tape players highly demanded to be reduced in size for mounting on motor vehicles.

In the present invention, a manually operable trigger (not illustrated) can be connected to the intermittent drive mechanism in addition to the automatically operated trigger mechanism to enable manual reverse operation at any time.

Although the invention had been described and exemplified by way of specific embodiments, it is not intended that it be limited thereto. As will be apparent to those skilled in the part, numerous modifications and variations of these embodiments can be made without departing from the spirit of the invention or the scope of the following claim.

What is claimed is:

1. An auto reverse mechanism for tape record/-playback devices, comprising:
   a pair of reel turntables;
   a pair of capstans;
   a pair of pinch rollers, one said pinch roller disposed adjacent to and selectively engageable with one of said capstans and the other said pinch roller disposed adjacent to and selectively engageable with the other of said capstans;

clutch means for selectively driving one or the other of said reel turntables;

a drive belt means for driving said capstans and for driving said clutch means to selectively drive said reel turntables;

change-over means for switching said clutch means from driving one of said reel turntables to driving the other of said reel turntables and for switching from one said pinch roller engaging its respective capstan to the other said pinch roller engaging its respective capstan;

drive force transmission means driven by said drive belt means for transmitting a driving force from said drive belt means;

intermittent drive means driven by said drive force transmission means for driving said change-over means to switch said clutch means and said pinch rollers;

detection means for detecting stoppage of a said reel turntable through said clutch means; and trigger means engaged with said drive force transmission means for causing said intermittent drive means to be driven by said drive force transmission means when said detection means detects stoppage of a said reel turntable, whereby said detection means detecting stoppage of a said reel turntable causes said change-over means to switch said clutch means and said pinch rollers.

2. The auto reverse mechanism as set forth in claim 1, wherein:

said drive belt means comprises a drive belt; and said drive force transmission means has a drive pulley driven by said drive belt, a drive force transmission gear coaxial with and driven by said drive pulley, an intermediate gear engaged with said drive force transmission gear, said drive force transmission gear and said intermediate gear together constituting a speed reduction mechanism, and a drive gear coaxial with and driven by said intermediate gear, said drive gear driving said intermittent drive means and engaging said trigger means.

3. The auto reverse mechanism as set forth in claim 1, wherein:

said drive force transmission means has a drive gear for transmitting driving force from said drive belt means;

said change-over means comprises a change-over lever, said change-over lever having a slot for engaging said intermittent drive means; and said intermittent drive means comprises an intermittent drive gear adjacent said drive gear of said drive force transmission means, said intermittent drive gear including a plurality of gear teeth disposed about the circumference of said intermittent drive gear, said intermittent drive gear further including a pair of vacant portions free from gear teeth at opposite positions on said circumference of said intermittent drive gear, said intermittent drive gear disposed such that said intermittent drive gear is unengaged with said drive gear of said drive force transmission means when a said vacant portion faces said drive gear and engaged with said drive gear when any other portion of said intermittent drive gear faces said drive gear, and a crank protrusion on said intermittent drive gear engaged with said slot of said change-over lever.

4. The auto reverse mechanism as set forth in claim 1, wherein:

said clutch means comprises a gear shaft and a gear mounted on said gear shaft;

said trigger means comprises a trigger lever, said trigger lever having a link strip extending therefrom; and said detection means comprises a detection plate rotatably supported on said gear shaft, a friction pad disposed between said gear and said detection plate, a spring biasing said detection plate toward said gear, and a link having one end connected to said detection plate and the other end connected to said link strip of said trigger lever.

5. The auto reverse mechanism as set forth in claim 1, wherein:

said intermittent drive means comprises an intermittent drive gear, said intermittent drive gear having at least one engagement groove thereon;

said detection means comprises a link for linking said detection means to said trigger means; and said trigger means comprises a crank gear shaft and a crank gear mounted thereon, said crank gear engaged with said drive force transmission means, and said crank gear having a circular groove therein eccentric with respect to said crank gear shaft, a crank lever pivotable about one end and having at its other end a crank pin engaged with said circular groove of said crank gear, said crank lever also having a trigger pin, a pivotably and reciprocably mounted trigger lever, said trigger lever having at one end a trigger groove, said trigger groove including a withdrawal portion, a slanted portion communicating with said withdrawal portion, and an engagement portion facing said slanted portion, said trigger pin of said crank lever engaging said trigger groove of said trigger lever, said trigger lever further having a trigger claw for engaging said engagement groove of said intermittent drive gear and a link strip connected to said link of said detection means.

* * * * *